(12) United States Patent
Even

(10) Patent No.: US 9,556,974 B2
(45) Date of Patent: Jan. 31, 2017

(54) SYSTEM FOR GUIDING AND SECURING THE POSITION OF STRAND ELEMENTS

(71) Applicant: Hydac Accessories GmbH, Sulzbach/Saar (DE)

(72) Inventor: Rainer Even, Saarbrücken (DE)

(73) Assignee: HYDAC ACCESSORIES GMBH, Sulzbach/Saar (DE)

( * ) Notice: Subject to any disclaimer, the term of this patent is extended or adjusted under 35 U.S.C. 154(b) by 0 days.

(21) Appl. No.: 14/427,461

(22) PCT Filed: Sep. 7, 2013

(86) PCT No.: PCT/EP2013/002691
§ 371 (c)(1),
(2) Date: Mar. 11, 2015

(87) PCT Pub. No.: WO2014/053207
PCT Pub. Date: Apr. 10, 2014

(65) Prior Publication Data
US 2015/0211659 A1    Jul. 30, 2015

(30) Foreign Application Priority Data

Oct. 4, 2012   (DE) .......... 10 2012 019 490

(51) Int. Cl.
H02G 3/18      (2006.01)
F16L 3/08      (2006.01)
H02G 3/32      (2006.01)

(52) U.S. Cl.
CPC ............... *F16L 3/08* (2013.01); *F03D 80/80* (2016.05); *F03D 80/85* (2016.05); *H02G 3/18* (2013.01); *H02G 3/32* (2013.01); *Y02E 10/722* (2013.01)

(58) Field of Classification Search
CPC ....... F16L 3/08; F03D 11/005; F03D 11/0066; F03D 80/85; F03D 80/80; H02G 3/18; H02G 3/32; H02G 3/0462; Y02E 10/722
USPC .................. 248/635, 68.1, 69, 56, 665, 650, 144,248/503, 72
See application file for complete search history.

(56) References Cited

U.S. PATENT DOCUMENTS

| | | | | |
|---|---|---|---|---|
| 2,179,406 A | * | 11/1939 | Fitzpatrick | F16L 3/221 174/146 |
| 2,470,814 A | * | 5/1949 | Hain | F16L 3/221 248/68.1 |
| 3,054,587 A | * | 9/1962 | Hebenstreit | F16L 3/1233 248/74.1 |

(Continued)

FOREIGN PATENT DOCUMENTS

| DE | 20 2006 006 347 U1 | 6/2006 |
|---|---|---|
| DE | 60 2005 002 793 T2 | 8/2008 |

(Continued)

*Primary Examiner* — Nkeisha Smith
(74) *Attorney, Agent, or Firm* — Wenderoth, Lind & Ponack, L.L.P.

(57) ABSTRACT

A system guides and secures the position of strand elements, such as cables, hoses or tubes, in particular in wind power installations. The system includes a base body (1) that forms at least one strand passage with a receiving space (19) for at least one strand element. The respective strand passages are formed by inserts (3) in the form of independent components. A locking device with a locking element (25) forms a form-fitting latching of each insert (3) on the base body (1).

7 Claims, 8 Drawing Sheets

(56) References Cited

U.S. PATENT DOCUMENTS

| | | | | |
|---|---|---|---|---|
| 4,386,752 | A * | 6/1983 | Pavlak | F16L 3/127 24/543 |
| 5,257,768 | A * | 11/1993 | Juenemann | F16L 55/035 248/604 |
| 5,553,818 | A * | 9/1996 | Wild | B60R 16/0222 248/56 |
| 5,702,076 | A | 12/1997 | Humber | |
| 6,248,953 | B1 * | 6/2001 | Miller | H02G 15/013 174/74 R |
| 7,015,394 | B2 * | 3/2006 | Desard | H02G 15/013 174/100 |
| 7,518,058 | B1 * | 4/2009 | Hagbrandt | H02G 3/02 174/113 C |
| 7,806,629 | B2 * | 10/2010 | McCoy | H02G 9/06 211/60.1 |
| 8,604,360 | B2 * | 12/2013 | Knorr | G02B 6/4444 174/564 |
| 8,664,544 | B2 * | 3/2014 | Even | F03D 11/0066 174/144 |
| 8,919,707 | B2 * | 12/2014 | Lee | H02G 3/30 248/56 |
| 9,127,789 | B2 * | 9/2015 | Caspari | F03D 11/0066 |
| 2002/0012582 | A1 * | 1/2002 | Kirkegaard | F03D 11/0066 415/4.3 |
| 2004/0256138 | A1 * | 12/2004 | Grubish | G02B 6/4442 174/93 |
| 2009/0159332 | A1 * | 6/2009 | Holmberg | H02G 3/22 174/652 |
| 2009/0272576 | A1 * | 11/2009 | Medina | H02G 3/30 174/72 A |
| 2009/0309313 | A1 * | 12/2009 | Knorr | G02B 6/4444 277/626 |
| 2011/0042529 | A1 * | 2/2011 | Walter | F16L 3/223 248/68.1 |
| 2011/0061931 | A1 * | 3/2011 | Su | H02G 3/081 174/665 |
| 2011/0290949 | A1 * | 12/2011 | Trouve | F16C 1/105 248/65 |
| 2012/0024595 | A1 * | 2/2012 | Even | F03D 11/0066 174/655 |
| 2012/0028511 | A1 * | 2/2012 | Even | F03D 11/0066 439/796 |
| 2012/0048616 | A1 | 3/2012 | Breen, IV | |
| 2014/0034789 | A1 * | 2/2014 | Caspari | F03D 11/0066 248/68.1 |
| 2014/0332249 | A1 * | 11/2014 | Barna | H02G 3/32 174/68.3 |
| 2015/0001354 | A1 * | 1/2015 | Brabander | F03D 11/00 248/69 |
| 2015/0222106 | A1 * | 8/2015 | Caspari | F03D 11/0066 174/651 |

FOREIGN PATENT DOCUMENTS

| | | |
|---|---|---|
| DE | 10 2010 040 446 B4 | 12/2011 |
| DE | 10 2010 032 686 A1 | 2/2012 |
| DE | 10 2010 032 687 A1 | 2/2012 |
| DE | 10 2011 012 391 A1 | 8/2012 |
| GB | 2 168 544 A | 6/1986 |

* cited by examiner

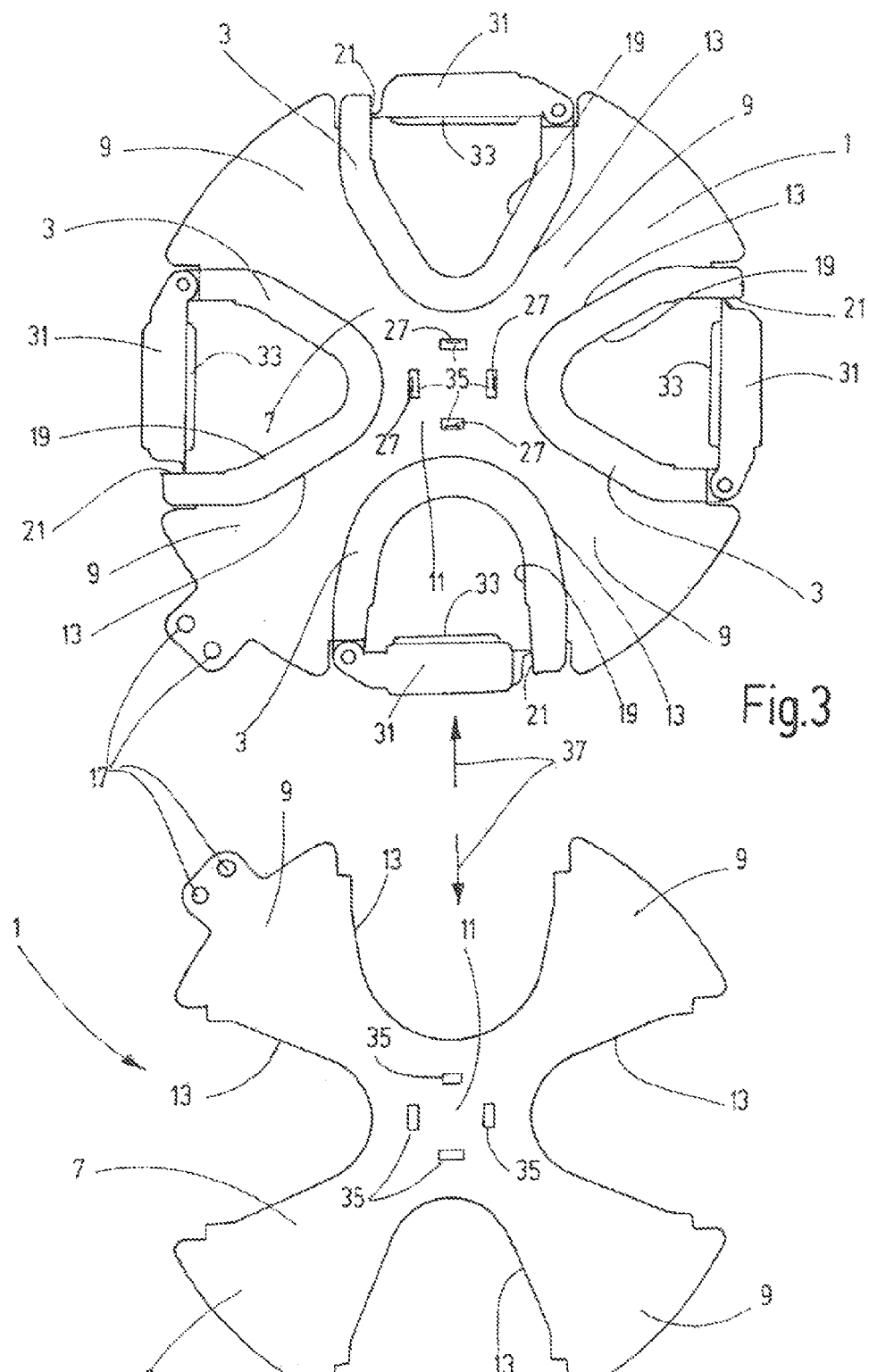

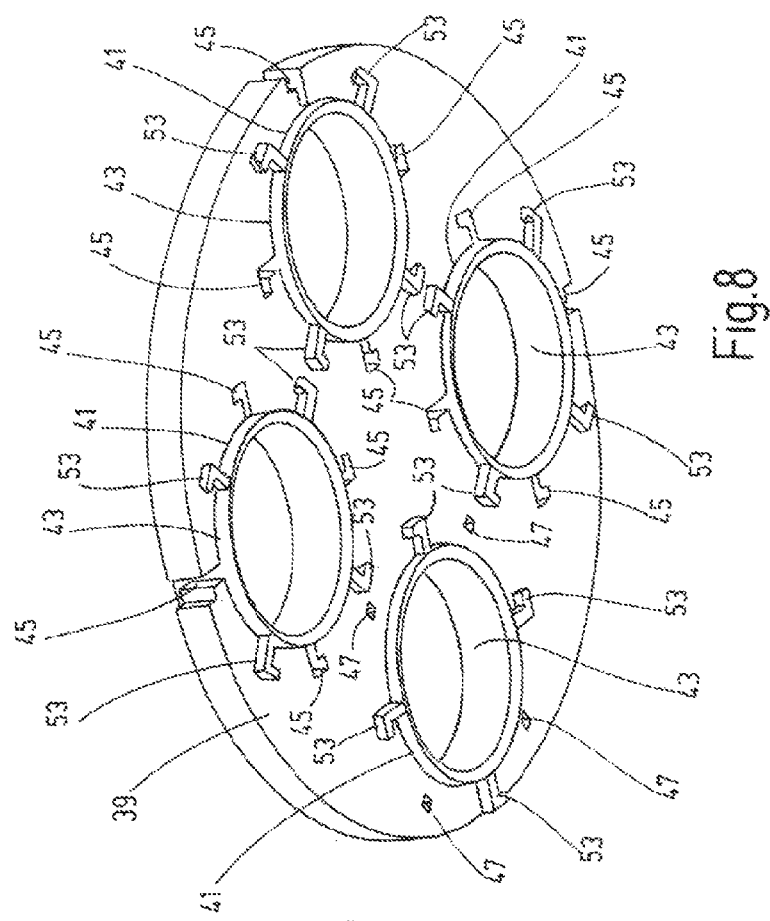
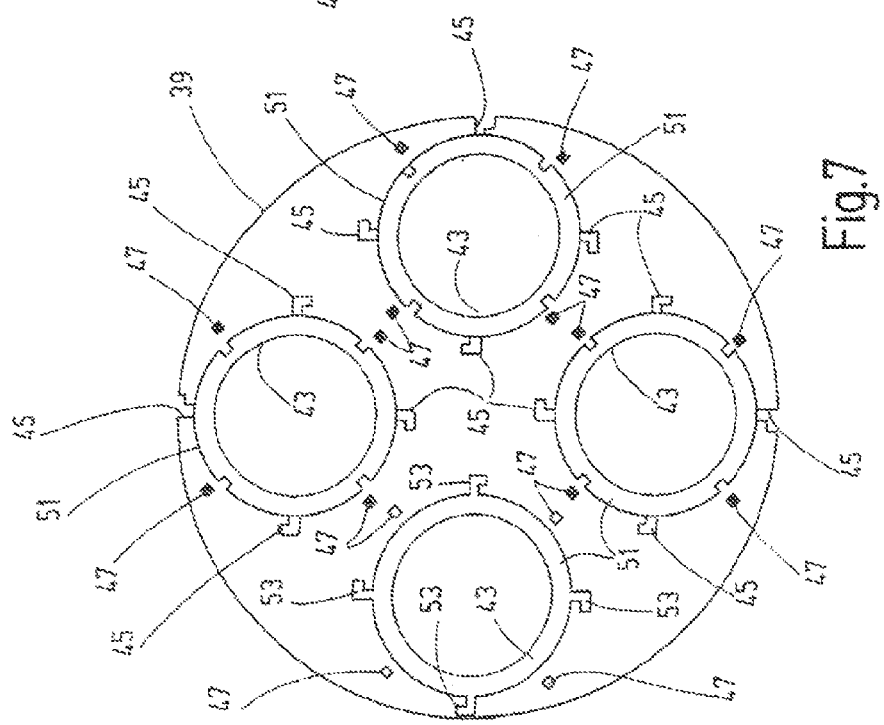

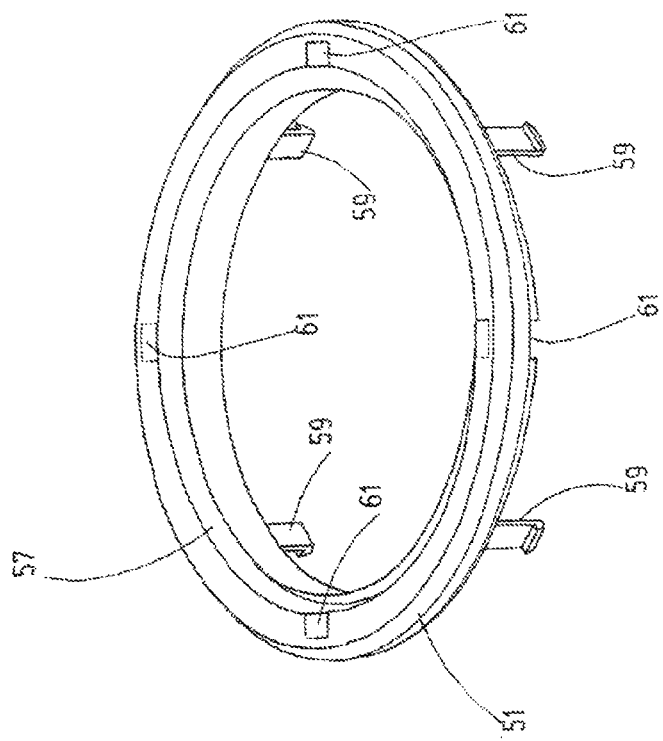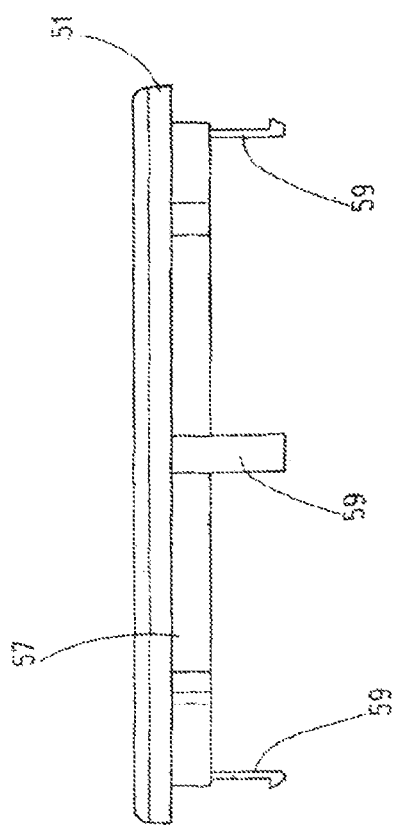

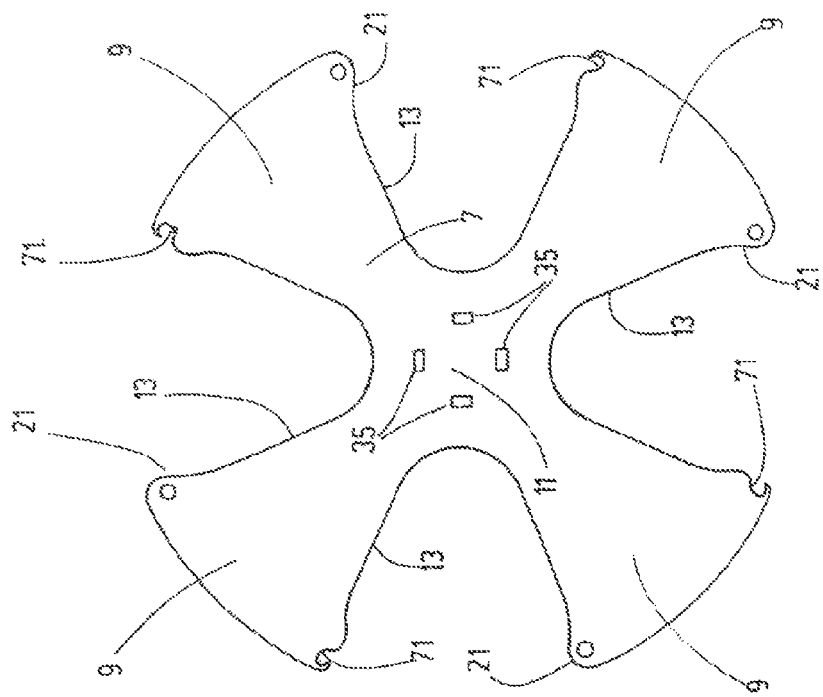
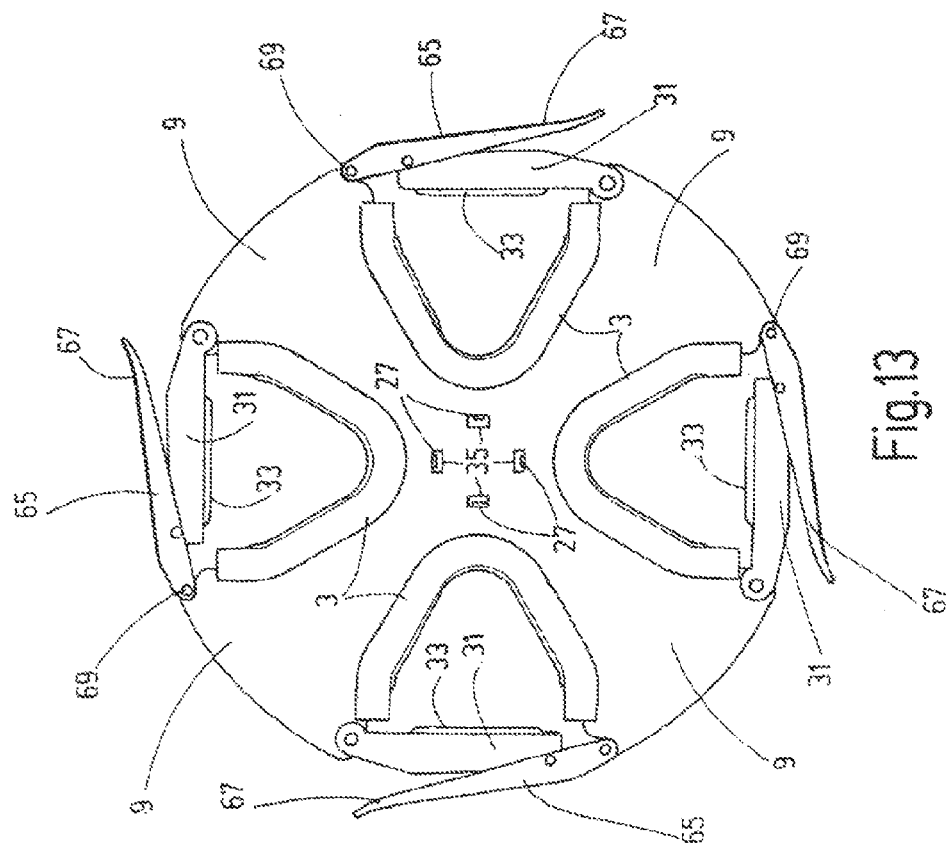

SYSTEM FOR GUIDING AND SECURING THE POSITION OF STRAND ELEMENTS

FIELD OF THE INVENTION

The invention relates to a system for guiding and securing the position of strand elements, such as cables, hoses or tubes, in particular in wind power installations. The system has a base body forming at least one strand passage, which passage delimits a receiving space for at least one strand element.

BACKGROUND OF THE INVENTION

Fastening systems of this type are the state of the art. DE 10 2010 032 687 A1, for example, discloses a fastening system of this type provided, in particular, for use with wind power installations. To convey the energy generated in wind power installations, and for other operational purposes, such as control, monitoring and the like, strand elements, such as cables for power transmission, hoses, tubes and/or lines for control or communication purposes, which lead from the nacelle into the tower, need to be reliably secured to appropriate support structures, for example to the tower segments.

With the aforementioned known solution, strand passages are formed in the base body for this purpose in such a manner that the strand passages succeed each other in a sequence extending at least over part of a ring, with external openings.

SUMMARY OF THE INVENTION

An object of the invention is to provide an improved system for guiding and securing strand elements that can be manufactured simply and efficiently, and thereby cost-effectively.

This object is basically achieved according to the invention by a system having as an essential feature, the respective strand passages being formed by inserts in the form of independent components, and a locking device having locking elements for forming a form-fitting latching of the respective inserts on the base body.

With the systems of the prior art, manufacturing the base body is elaborate because this base body is not only a component supporting the strand passages, but also forms the strand passages due to the corresponding design. Along with the special design needed for this purpose, the base body, for example, with wind power installations, with a larger number of strand passages for likewise larger strand diameters, represents a component of large overall dimensions. This size compels the use of large format tools, for example, for the injection molding of the base body, whereby the manufacturing is cost-intensive. In contrast, with the invention, in that separate inserts each form strand passages that can be locked on the respective base body, the possibility arises to form a base body in a simple manner because the base body only needs to fulfill the function of a support body without itself forming strand passages.

The system according to the invention is furthermore, cost-effective insofar as it represents a type of modular system for a broad range of applications, with which different inserts having receiving spaces of different shapes and dimensions can be locked in a freely selectable arrangement to a base body. The base body only needs to form the supports for inserts, which can be shaped differently to adapt to different types and sizes of strand elements.

The locking device, in an advantageous manner, can have locking elements on the respective insert in the form of projecting hook parts. The hook parts form latch surfaces for forming a catch, securing the inserts to the base body.

With particular advantage, the locking device on the base body can have locking elements in the form of recesses. The recesses allow a form-fitting engagement at least of one part of hook parts located on the respective insert.

With particularly advantageous example embodiments, a base body is provided in the shape of a carrier plate, whose edge extends along at least one part of a circle. Passages, in which inserts can be accommodated, are formed and distributed along the edge of the carrier plate. Such carrier plates can be simply and efficiently manufactured as a metal part, for example.

Such a carrier plate can, in an advantageous manner, form an arc having an outer peripheral edge and an inner edge at a radial distance thereto. Starting from the peripheral edge, passages are formed for inserts. At ends of the passages facing toward the inner edge, projecting hook parts having latch surfaces located thereon can overlap the inner edge of the carrier plate for forming the locking. With inserts, injection molded from plastic material, the hook parts can be formed by integrally molded projections.

Alternatively, with advantageous example embodiments, the carrier plate can have the form of a star-shaped body having arms, the ends of which lie on a circular line. Passages are formed for a respective insert between the arms. On the ends of the inserts facing toward the center of the star-shaped body, hook parts are provided with latch surfaces that engage in associated boreholes of the star-shaped body for forming the locking. Thereby, inserts, which are disposed lying radially outside in the star, can be locked in the passages against radial movement due to fastening to the central region of the star-shaped body. The inserts can have receiving spaces of different shapes and/or sizes.

With particularly advantageous exemplary embodiments, the receiving spaces can, for the insertion of strand elements, have a lateral opening that can be closed by a cover device exerting a retaining force on inserted strand elements. The arrangement can be designed so that the cover device, as is known from the aforementioned document DE 10 2010 032 687 A1, has a retaining body, and a tension strap guided over the retaining body, which tension strap tensions the retaining body against the stand elements inserted in the strand passages.

In particularly advantageous exemplary embodiments, the carrier plate has the shape of a circular disk. Passages are provided in the circular disk for inserts in the form of ring bodies and are provided disposed along the periphery.

The arrangement can be designed with advantage so that inserts that can be pushed from one side into the passages of the disk are provided in the form of integral ring bodies. On ring bodies, radially projecting shoulders are integrally molded as locking elements. In an insertion position, the locking elements can penetrate through recesses of the disk and, by rotation of the ring body out of the insertion position into a locking position, engage behind the assigned edge of the respective passage of the disk. A locking in the form a bayonet locking is thereby formed. The circular disk provided as a base body can be manufactured efficiently, using laser technology, from a metal disk, having the passages for the inserts and the recesses for the radially projecting shoulders of the ring bodies. Alternatively, fabric-based laminate and waterjet cutting, or other mechanical processing is also possible.

With particularly preferred exemplary embodiments, in which the radially projecting shoulders have angled latch noses on the end, the respective ring bodies can be secured in the locking position in that the latch noses latch with latch recesses of the disk.

Alternatively, two-part ring bodies can be provided with ring halves formed as identical parts. These parts can be pushed from opposite sides into the respective passages of the disk, and are provided with latch noses and latch receivers as locking elements, which, during pushing in, latch the ring halves with each other for forming the assembled ring body.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure:

FIG. 3 is a top view of a carrier plate in the form of a star-shaped body, with an associated tension strap being omitted according to a second exemplary embodiment of the invention;

FIG. 4 is a top view of the star-shaped body from FIG. 3, shown in an individual representation;

FIG. 7 is a top view of a system according to a third exemplary embodiment of the invention having a carrier plate in the form of a circular disk and having four inserts formed by the ring bodies of FIGS. 5 and 6;

FIG. 8 is an oblique perspective view of the bottom side of the system of FIG. 7;

FIG. 9 is a side view of only one ring half for forming an assembled ring body, which is provided as an insert according to a modified exemplary embodiment of the invention;

FIG. 10 is a perspective view of the ring halves of FIG. 9;

FIG. 13 is a top view of a system according to a fifth exemplary embodiment of the invention, similar to FIG. 3, but with a tension lock provided instead of a tension strap;

FIG. 14 is a top view of the star-shaped body of the embodiment of FIG. 13 serving as a carrier plate;

DETAILED DESCRIPTION OF THE INVENTION

Figure 1:
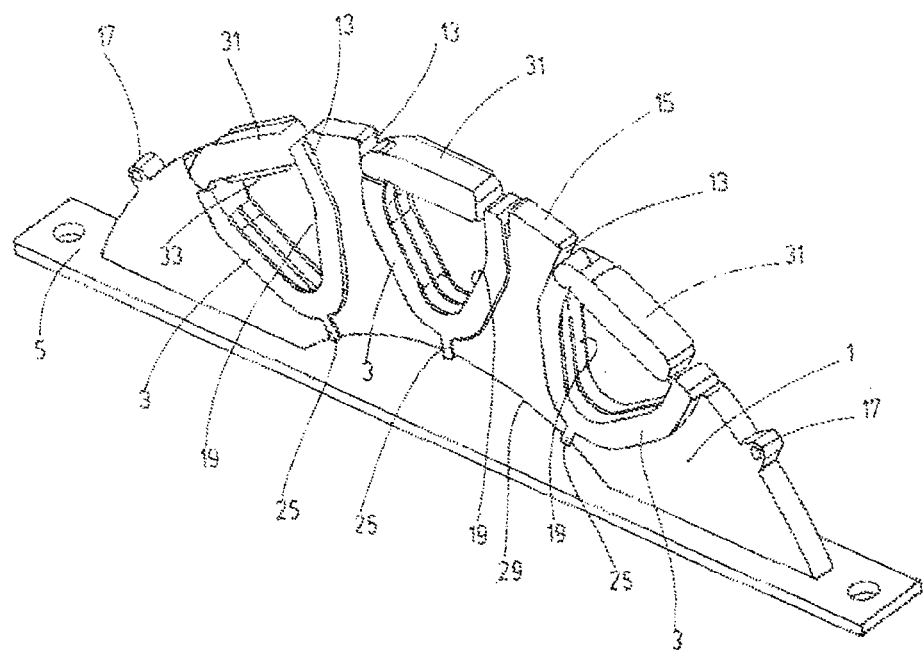
FIG. 1 is a perspective view of a system according to a first exemplary embodiment of the invention, having three inserts serving as strand passages, secured in a carrier plate, with an associated tension strap being omitted.

FIGS. 1 to 4 show exemplary embodiments of the system according to the invention having inserts 3 fixed to a base body in the form of a carrier plate 1. One insert 3 is shown in an individual representation in FIG. 2. With the example from FIG. 1, the carrier plate 1 has the shape of a circular arc section, is composed of a metal material, and is welded to an associated fastening element 5. With the example of FIGS. 3 and 4, the carrier plate 1 has the shape of a star-shaped body 7 having four arms 9 that extend radially outward from the center 11 and at the outer ends thereof define an imaginary circular line. Passages 13 extend from the peripheral edge in the direction of the center 11. Inserts 3 can be accommodated and locked in passages 13 formed between the arms 9. With the example of FIG. 1, passages 13 for inserts 3 are formed in a corresponding manner starting from the outer peripheral edge 15.

Figure 2:
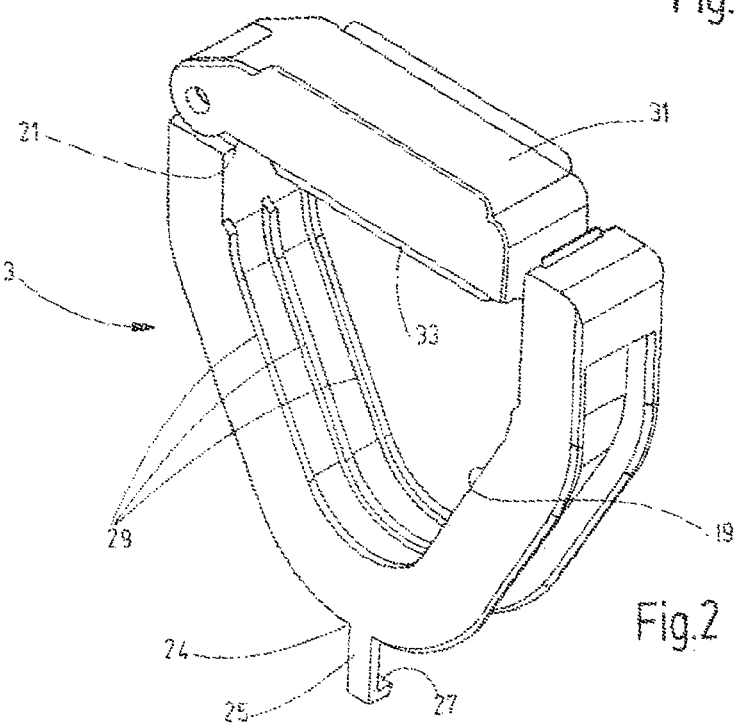
FIG. 2 is a perspective view shown in larger scale of only a single insert of the system of FIG. 1.

Fastening locations 17 are provided both on an arc of the carrier plate 1 of FIG. 1, as well as on the star-shaped body 7 of FIGS. 3 and 4, for a tension strap, not shown, as is known from the prior art, (see DE 10 2010 032 687 A1). By using a tension strap, the outer periphery of the carrier plate can be tensioned. FIG. 2 shows the design of an insert 3 in the form of an injection molded part composed of a thermoplastic plastic material. Insert 3 is formed trough-shaped and delimits a strand passage 19, which strand passage extends from an outer opening 21 with a substantially V-shaped tapering in the direction of a locking end 24 on which projecting hook part 25 is integrally molded and provided as a locking element. The hook part 25 is angled at its free end such that a latch surface 27 is formed. With the example of FIG. 1, the latch surface 27 overlaps the inner edge 29 of the arc of the carrier plate 1 to lock the respective insert 3 at the carrier plate 1.

Retaining ribs 29, formed as strand receivers for strand elements (which are not shown) inserted via the opening 21, are projecting on the inside of the strand passage 19 of the inserts 3. The opening 21 can be closed by a pusher part 31 in a manner know from the aforementioned document, which as a part of the cover device in cooperation with the tension strap (not shown) exerts a retaining force on inserted strand elements via a spring-loaded pressure element 33. The pusher parts 31, as is also known, are pivotably hinged at the edges of the openings 21. With the example embodiment of FIGS. 3 and 4, the hook parts 25 for locking the inserts 3 engage with the latch surfaces 27 thereof in assigned, rectangular shaped boreholes 35 formed in the center 11 of the star shaped body 7. FIG. 2 shows a strand passage 19 in the form of a substantially V-shaped trough, wherein the passages 13 in the carrier plate 1 also have a V-shape corresponding hereto. In contrast, FIGS. 3 and 4 show, at the location marked with arrows 37, a U-shape of the respective passages 13 for an insert 3 in the shape of a U-shaped trough, with which the strand passage 19 is likewise designed to be U-shaped.

FIGS. 5 to 8 show an exemplary embodiment in which the carrier plate is formed by a metal circular disk 39. Circular passages 41 are formed in disk 39 for inserts in the form of ring bodies 43. These passages 41, and further recesses 45 and 47 in the circular disk 39 are preferably formed using laser processing.

Figure 6:
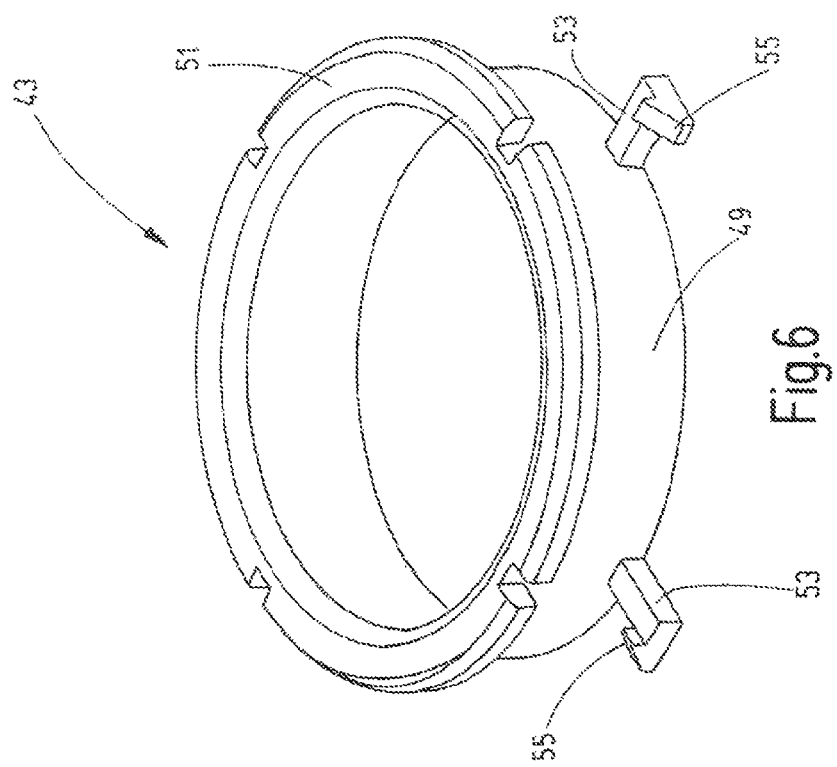
FIG. 6 is a perspective view of the ring body of FIG. 5.
Figure 5:
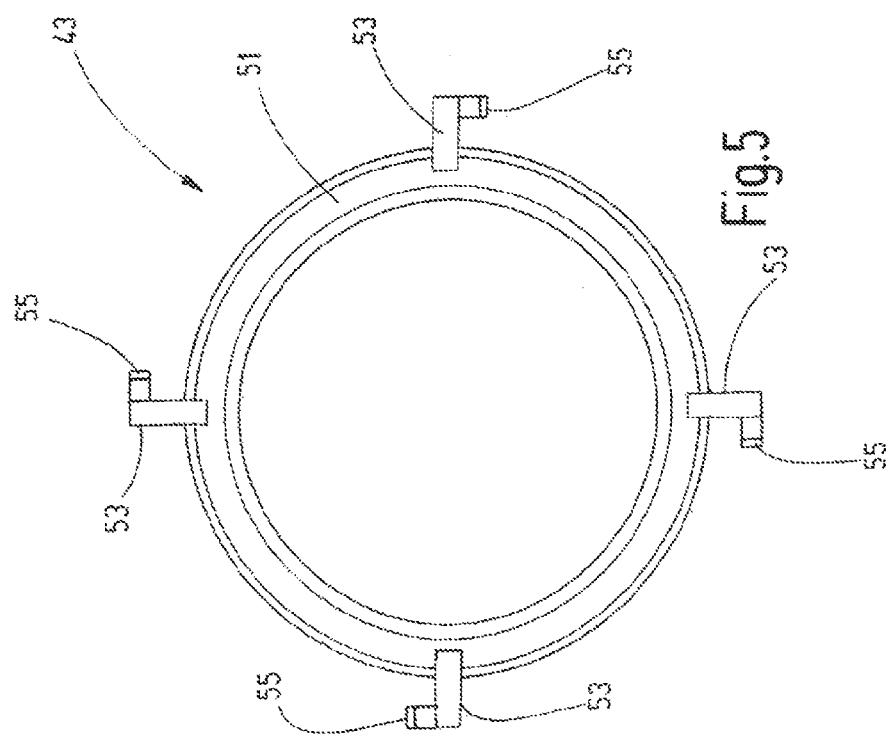
FIG. 5 is a top view of an insert formed by a ring body having a strand passage in the form of a passage ring according to an exemplary embodiment of the invention.
Figure 11:
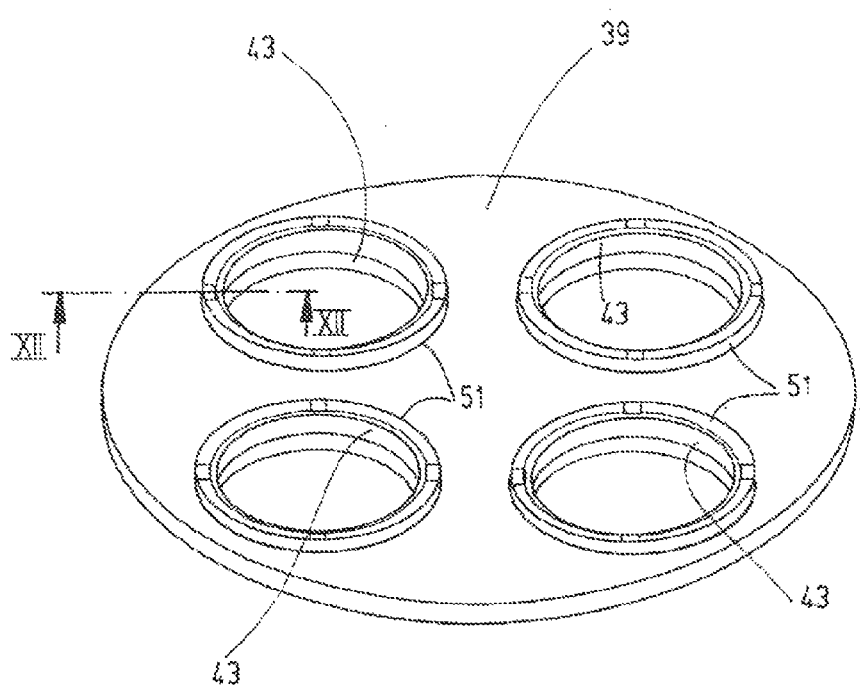
FIG. 11 is a perspective view of a system according to a fourth exemplary embodiment of the invention with the ring halves of FIGS. 9 and 10 provided as inserts.
Figure 12:
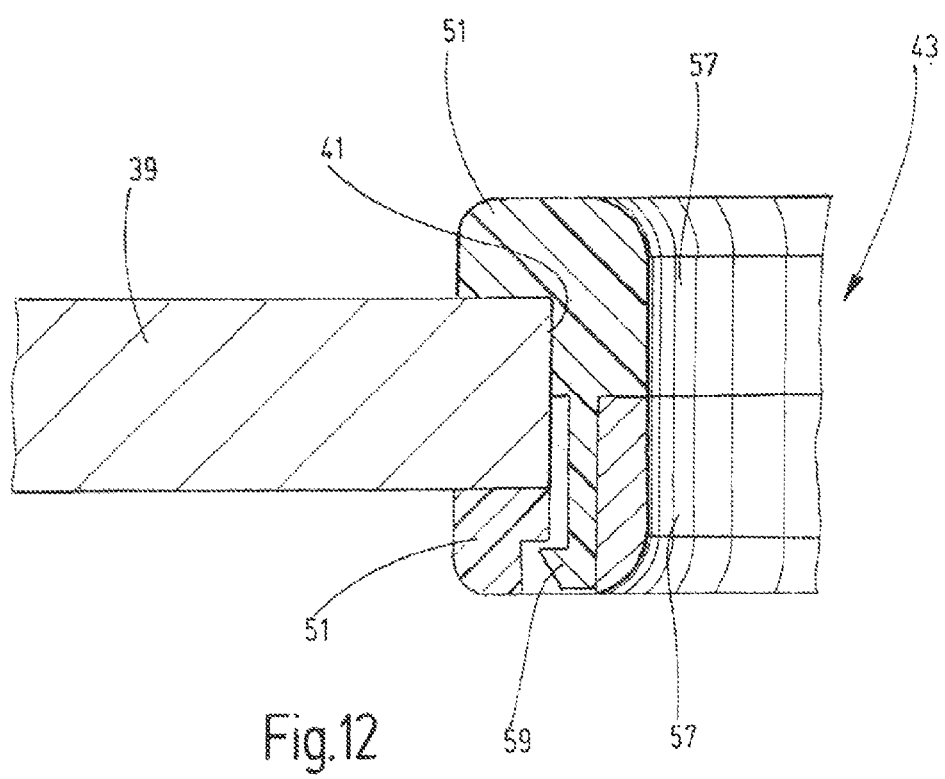
FIG. 12 is an enlarged partial side view in section of the system of FIG. 11 taken along line 12-12 of FIG. 11.

As shown most clearly in FIGS. 5 and 6, the ring bodies 43 have a circular cylindrical part 49 (FIG. 6), that can be pushed in from the top side of the circular disk 39, visible in FIG. 7, into the passage 41. A radially projecting end edge 51 lies on the top side of the circular disk 39. On the opposite, bottom end of the cylindrical part 49, radially projecting shoulders 53 are integrally molded as locking elements that can penetrate through the recesses 45 of the disk 39 while pushing the ring bodies 43 into the passages 41. FIG. 7 shows the ring body 43, located on the extreme left, in the insertion position thereof, in which the shoulders 53 are aligned on the recesses 45 of the disk 39 so that the inserts 53 can penetrate through the recesses 45 and the ring body 43 can be inserted into the passage 41. In contrast, the remaining ring bodies 43 shown in FIG. 7 and in FIG. 8 are rotated out of the insertion position into the end position or locking position, in which the shoulders 53 are located on the bottom side of the disk 39 as locking elements; see FIG. 8 where the bottom side of the disk 39 is visible. The recesses 45, in interaction with the shoulders 53 and using the ability of the ring bodies 43 to rotate, thus form a type of bayonet lock for locking the ring bodies 43 to the disk 39. As shown in FIGS. 5 and 6, the shoulders 53 have latch noses 55 angled at the end sides. Latch noses 55 fall into recesses 47 during rotation of the ring bodies 43 into the end position to secure the ring bodies 43 in the rotation position corresponding to the locking position. FIG. 8 shows the same situation as FIG. 7. FIGS. 9 to 12 show a further exemplary embodiment having a base body in the shape of a circular disk 39. Circular disk 39 contains no further recesses other than circular passages 41 for inserts. The inserts are provided again in the shape of ring bodies 43. In contrast to FIGS. 5 to 8, ring bodies 43 are not formed as integral plastic bodies, but rather are formed two-piece. Two identical ring halves 57 are provided for this purpose, which ring halves 57 have latch noses 59 and latch receivers 61.

During pushing into the passage 41 of the disk 39, the ring halves 57 latch together from opposite sides of disk 30 to form the assembled ring body 43. The radially projecting end edges 51 lie on the top and bottom side of the disk 39.

FIGS. 13 and 14 show an exemplary embodiment that corresponds to the example from FIGS. 3 and 4, except that the cover device does not have a tension strap for interacting with the pressure parts 31. Rather, a tension lock contains a known tension lever 65 containing a spring assembly. This tension lever, on the end opposite the handle 67, has a pin 69 that can be hooked in a recess 71 on the edge of the openings 21 of the passages 13 during the pivoting of the tension lock in the position locking the opening 13 of the respective passage 13.

Figure 16:
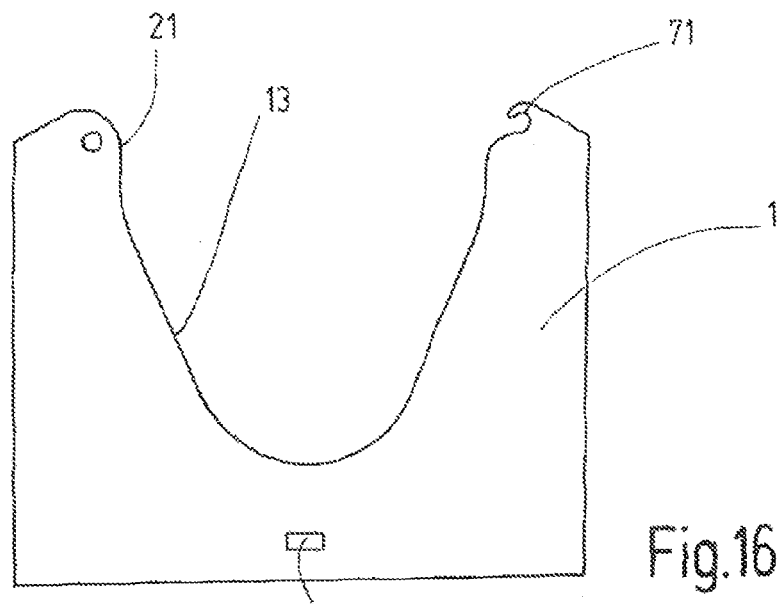
Figure 15:
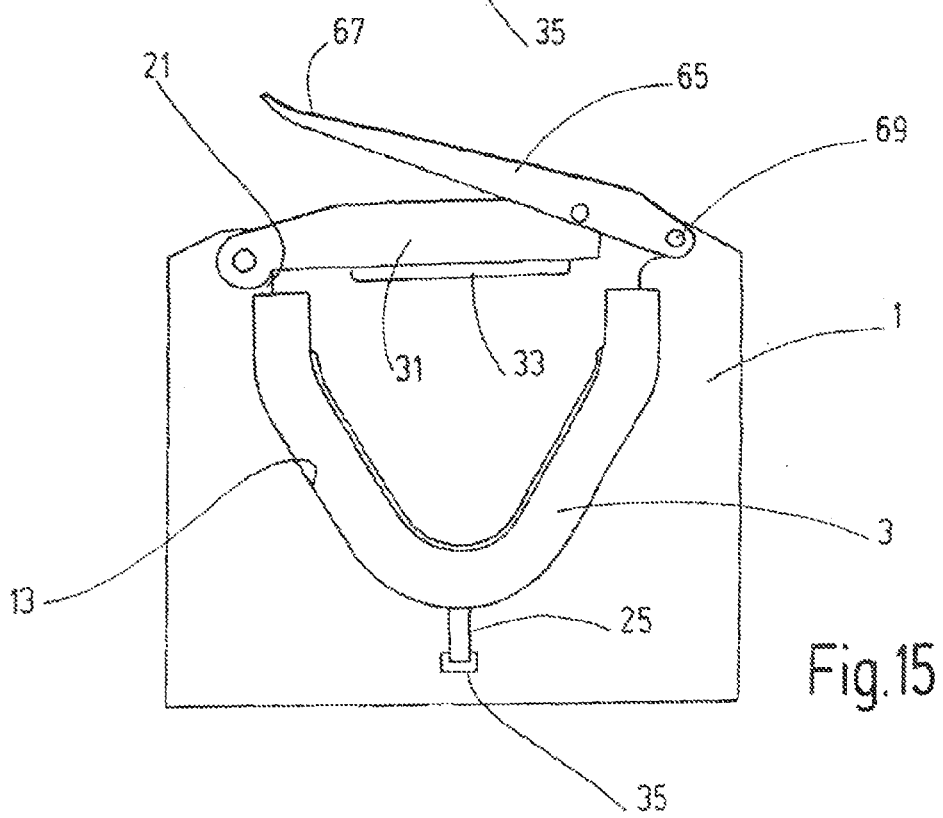
FIG. 15 is a side view of an insert in a base body, provided with tension lock according to a sixth exemplary embodiment of the invention, and FIG. 16 a side view of the base body of FIG. 15.

FIGS. 15 and 16 shows an exemplary embodiment with which a carrier plate 1 having only one passage 13 for receiving a single insert 3 is provided as a base body. With this embodiment, a rectangular bore hole 35 is provided for locking the insert 3 in place, by catching with the latch surface of the hook part 25 of the insert 3. A tension lock is provided, as with the example from FIGS. 13 and 14, as a cover device for locking the opening 21 of the passage 13.

While various embodiments have been chosen to illustrate the invention, it will be understood by those skilled in the art that various changes and modifications can be made therein without departing from the scope of the invention as defined in the claims.

The invention claimed is:

1. A system for guiding and securing strand elements, comprising:
    a carrier plate having a star-shaped body with radially extending arms and having a peripheral edge on ends of said arms extending along a circle line;
    insert passages formed in said carrier plate between said arms and distributed along said peripheral edge;
    inserts having strand receiving spaces therein for receiving strand elements, said inserts being formed independently of said carrier plate and being received in said insert passages, said receiving spaces having radially outward openings releasably closed by cover devices exerting radial retaining forces on strand elements inserted in said receiving spaces;
    projecting hook parts on radially inner ends of said inserts extending radially toward a center of said star-shaped body, said hook parts having latch surfaces thereof; and
    boreholes in said star-shaped body engaging said latch surfaces of said hook parts and locking said inserts in said insert passages in said carrier plate.

2. A system according to claim 1 wherein
said receiving spaces in said inserts have at least one of different shapes or sizes.

3. A system according to claim 1 wherein
said insert passages are open radially outward of said star-shaped body.

4. A system according to claim 1 wherein
said circular line extends about an axis; and
said boreholes extend in said star-shaped body parallel to said axis.

5. A system for guiding and securing strand elements, comprising:
    a carrier plate having a peripheral edge extending along at least a part of a circle and about an axis and having radially extending arms;
    insert passages formed in said carrier plate between said arms and distributed along said peripheral edge and opening radially outwardly;
    inserts having strand receiving spaces therein for receiving strand elements and opening radially outwardly, said inserts being formed independently of said carrier plate and being received in said insert passages;
    projecting hook parts on radial inner ends of said inserts extending toward said axis of said carrier plate, said hook parts having latch surfaces extending parallel to said axis; and
    latch edges extending coaxially to said axis on said carrier plate, said latch surfaces engaging said latch edges locking said inserts in said insert passages in said carrier plate.

6. A system according to claim 5 wherein
said latch edges are continuously connected and form an inner arcuate edge of said carrier plate coaxial to said peripheral edge.

7. A system according to claim 5 wherein
said hook parts overlie an outer surface of said carrier plate extending radially relative to said axis and being between said insert passages and said latch edges.

* * * * *